(12) United States Patent
Mahmulyin

(10) Patent No.: US 6,913,227 B1
(45) Date of Patent: Jul. 5, 2005

(54) AIRCRAFT YOUTH SEAT/FAMILY SEATING ARRANGEMENT

(75) Inventor: Vedad Mahmulyin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/708,734

(22) Filed: Mar. 22, 2004

(51) Int. Cl.$^7$ .............................................. B64D 11/06
(52) U.S. Cl. ................................ 244/118.5; 244/122 R
(58) Field of Search ...................... 244/118.5, 118.6, 244/122 R, 122 AG; 297/129, 174 CS, 216.11, 297/219.12, 250.1, 251, 256.1, 234, 411.24

(56) References Cited

U.S. PATENT DOCUMENTS

| | | | | |
|---|---|---|---|---|
| 18,377 | A | * | 10/1857 | Beach .......................... 297/234 |
| 757,334 | A | * | 4/1904 | Murch .......................... 297/234 |
| 883,929 | A | * | 4/1908 | Baxter .......................... 297/234 |
| 2,122,447 | A | * | 7/1938 | Zand ............................. 454/76 |
| 2,332,841 | A | * | 10/1943 | Buckwalter et al. ...... 244/118.6 |
| 2,714,923 | A | * | 8/1955 | Carothers .................... 297/251 |
| 3,351,381 | A | * | 11/1967 | Boblitz ................... 244/122 R |
| 4,382,628 | A | * | 5/1983 | Palmgren ..................... 297/232 |
| 4,500,135 | A | * | 2/1985 | Kincheloe ............... 297/216.11 |
| 4,627,659 | A | * | 12/1986 | Hall ............................. 297/488 |
| 4,771,969 | A | * | 9/1988 | Dowd ....................... 244/118.6 |
| 4,900,086 | A | * | 2/1990 | Steward ....................... 297/238 |
| 4,936,620 | A | * | 6/1990 | Francois et al. ............... 296/64 |
| 5,083,726 | A | * | 1/1992 | Schurr ....................... 244/118.6 |
| 5,104,065 | A | * | 4/1992 | Daharsh et al. ........... 244/118.6 |
| 5,118,163 | A | * | 6/1992 | Brittian et al. ............ 297/250.1 |
| 5,178,345 | A | * | 1/1993 | Peltola et al. ............. 244/118.6 |
| 5,265,828 | A | * | 11/1993 | Bennington .............. 244/122 R |
| 5,415,250 | A | * | 5/1995 | Rojas ........................... 186/40 |
| 5,845,876 | A | * | 12/1998 | Zach, Sr. .................. 244/118.6 |
| 6,000,659 | A | * | 12/1999 | Brauer ...................... 244/118.6 |
| 6,012,679 | A | * | 1/2000 | Auestad .................... 244/118.6 |
| 6,575,406 | B2 | * | 6/2003 | Nelson ......................... 244/119 |
| 6,616,242 | B1 | * | 9/2003 | Stoll ............................ 297/485 |
| 6,652,024 | B2 | * | 11/2003 | Prasatek ................... 297/188.2 |
| 6,669,141 | B2 | * | 12/2003 | Schmidt-Schaeffer .... 244/118.6 |
| 2003/0098391 | A1 | * | 5/2003 | Sankrithi et al. ......... 244/118.6 |
| 2003/0106962 | A1 | * | 6/2003 | Smallhorn ............... 244/118.5 |
| 2003/0218095 | A1 | * | 11/2003 | Saint Jalmes ............ 244/118.5 |

* cited by examiner

*Primary Examiner*—Teri Pham Luu
*Assistant Examiner*—Stephen A Holzen
(74) *Attorney, Agent, or Firm*—Thomas E. Donohue, Esq.; Artz & Artz, P.C.

(57) ABSTRACT

A method of improving aircraft seating efficiency is provided, including positioning a first plurality of seating rows within a first region of an aircraft interior. The first region comprises a first aircraft width and each of the first plurality of seating rows comprises a uniform first quantity of standard aircraft seats. The standard aircraft seats have a standard aircraft seat width. The method further includes locating a tapered region of said aircraft interior having a second aircraft width. The second aircraft width is sufficiently less than the first aircraft width such that the first quantity of standard aircraft seats cannot fit within the tapered region. The method includes positioning a second plurality of seating rows within the tapered region. Each of the second plurality of seating rows includes a second quantity of standard aircraft seats having the standard aircraft seat width. The second quantity of standard aircraft seats is aligned with the first quantity of standard aircraft seats to form a plurality of aircraft columns. The method includes positioning at least one reduced dimension youth aircraft seat within one of the second plurality of seating rows to increase a net aircraft passenger capacity.

18 Claims, 3 Drawing Sheets

AIRCRAFT YOUTH SEAT/FAMILY SEATING ARRANGEMENT

BACKGROUND OF INVENTION

The present invention relates generally to an aircraft youth seat and more particularly to a method for improving airline seating marketing and efficiency.

The airline industry is often operated under tight fiscal restraints. Airline production and operations, therefore, is often required to perform at high levels of efficiency. Traditional improvements in efficiency often are implemented on the design side of the industry. The extended lifecycle of many aircraft provides such improvements from rapidly impacting the industry as a whole or providing benefits to existing aircraft. For this reason, existing aircrafts and aircraft designs often retain inefficient and underutilized systems and forms.

This can be especially true of the vast majority of wide body commercial aircraft in operation today. These aircraft often rely heavily on nearly full in-flight paid passenger density in order to provide optimal economic benefits. Although modern approaches commonly are directed towards sales and marketing to fill existing passenger seat layouts, there is ample room for improvement in efficiency by reducing the percentage of underutilized space within the aircraft. Existing layouts are typically comprised of one or two aisles positioned between two or three rows of seats. These seats are positioned generally in columns running fore-aft of the aircraft. In a large portion of the aircraft the width remains constant and therefore the number of seats within each row remains constant. The number of seats is commonly maximized in this area to provide increased efficiency.

In regions of the aircraft, such as aft or forward fuselage, the aircraft width begins to taper down. This tapering is commonly done at a relatively low rate (angle) since it is an efficient aerodynamic solution. The result of this tapering of the aircraft width is that there is commonly not enough room to accommodate the same seat count as the large constant-width portion of the aircraft. As a result of this reduction in dimensions at least one seat must be dropped from that row. This, in turn, leaves an underutilized space that holds potential for both airline efficiency and marketability.

It would be highly desirable to have utilization for such underutilized space that improved airline passenger seating efficiency. It would further be highly desirable to develop utilization for such underutilized space wherein a desirable marketing potential for airline ticket sales could be developed.

SUMMARY OF INVENTION

It is therefore an object to the present invention to provide method of improving aircraft seating efficiency. It is further object of the present invention to provide a method of improving aircraft seating efficiency with improve marketability.

In accordance with the objects of the present invention a OLE_LINK3 method of improving aircraft seating efficiencyOLE_LINK3 is provided. The method includes positioning a first plurality of seating rows within a first region of an aircraft interior. The first region comprises a first aircraft width and each of the first plurality of seating rows comprises a uniform first quantity of standard aircraft seats. The standard aircraft seats have a standard aircraft seat width. The method further includes locating a tapered region of said aircraft interior having a second aircraft width. The second aircraft width is sufficiently less than the first aircraft width such that the first quantity of standard aircraft seats cannot fit within the tapered region. The method includes positioning a second plurality of seating rows within the tapered region. Each of the second plurality of seating rows includes a second quantity of standard aircraft seats having the standard aircraft seat width. The second quantity of standard aircraft seats is aligned with the first quantity of standard aircraft seats to form a plurality of aircraft columns. The method includes positioning at least one reduced dimension youth aircraft seat within one of the second plurality of seating rows to increase a net aircraft passenger capacity.

Other objects and features of the present invention will become apparent when viewed in light of the detailed description and preferred embodiment when taken in conjunction with the attached drawings and claims.

DETAILED DESCRIPTION

Figure 1:
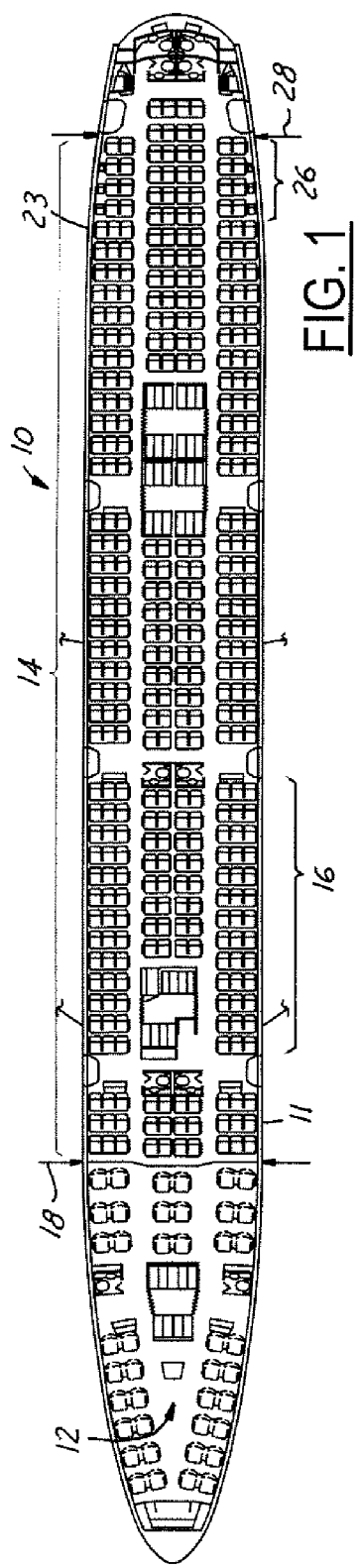
FIG. 1 is an illustration of an aircraft assembly in accordance with the present invention, the aircraft assembly illustrated incorporating the aircraft youth seat.
Figure 2:
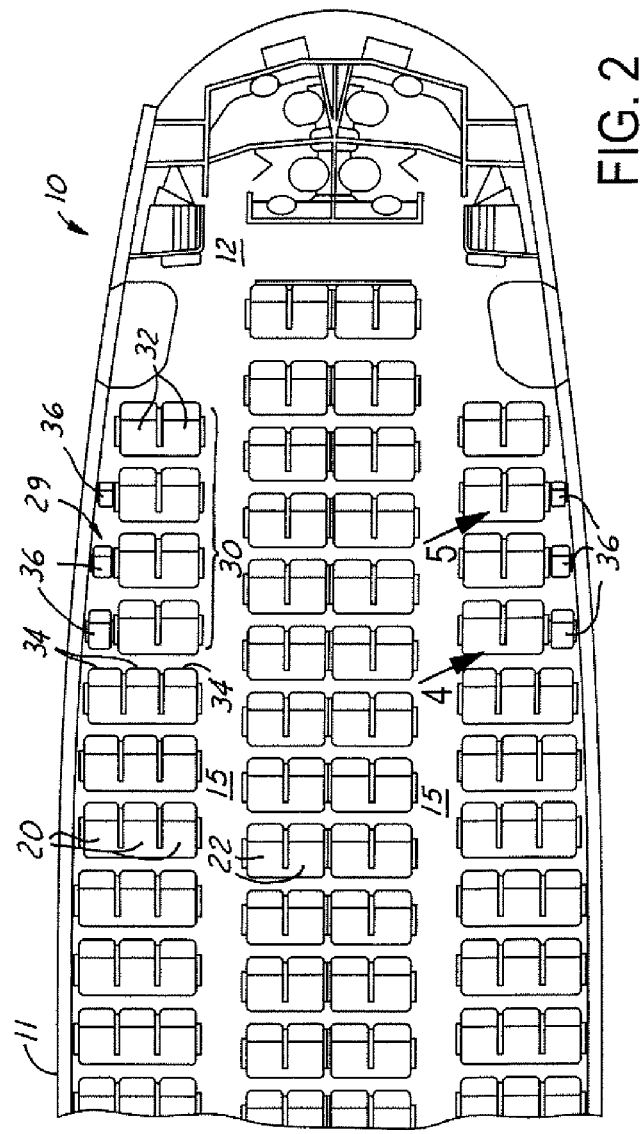
FIG. 2 is a detailed illustration of the aircraft assembly illustrated in FIG. 1.
Figure 3:
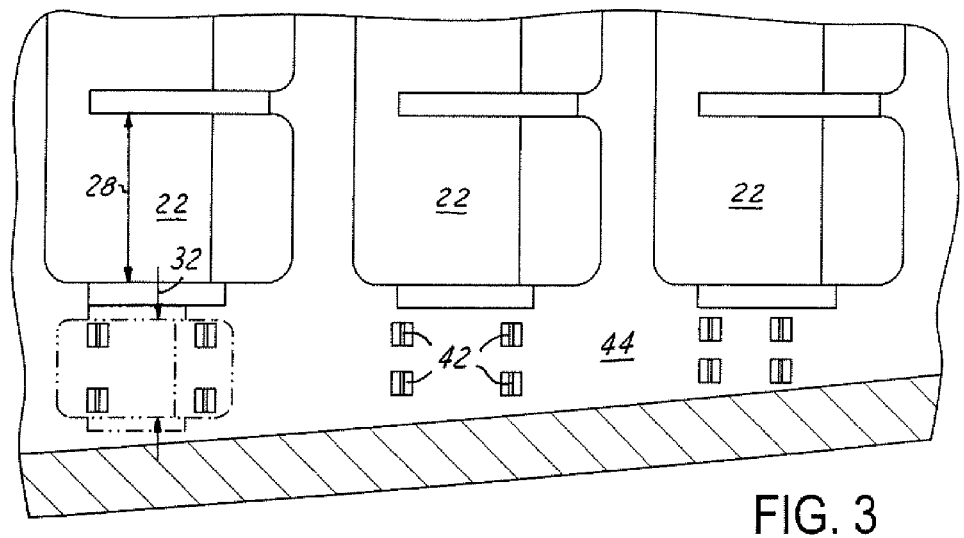
FIG. 3 is a close-up detail of a portion of the aircraft assembly illustrated in FIG. 1, the detail illustrating floor latch mounts for a removable aircraft youth seat.

Referring now to FIG. 1, which is an illustration of an aircraft 10 in accordance with the present invention. The overall configuration of the aircraft 10 is for illustrative purposes only and is not intended to generate limitations on the present invention. By way of example, a wide-body commercial aircraft 10 is illustrated. These aircraft 10 include a fuselage 11 defining an aircraft interior 12. The aircraft interior 12 defines a first region 14 having a first aircraft width 18. A first plurality of seating rows 16 are positioned within this first region 14. The first region 14 is defined in the majority of aircraft as having a relatively uniform first aircraft width 18. This allows the aircraft aisles 15 and the first plurality of seating rows 16 to be arranged in relatively uniform aircraft seating columns 34. Thus each of the first plurality of seating rows 16 contains a uniform first quantity 20 of standard aircraft seats 22 (see FIG. 2). Each of the standard aircraft seats 22 comprises a standard aircraft seat width 28 optimized for adult seating.

Aerodynamics and other design factors, however, prevent such a uniform first quantity 20 to be positioned throughout the aircraft interior 12. The fuselage 11 commonly experiences a low-rate taper 23 toward the rear of the aircraft 10 thereby defining a second region 26 also referred to as a tapered region. This tapered region 26 is comprised of a second aircraft width 28 which gradually reduces from the first aircraft width 18 as the tapered region 26 progresses towards the tail region of the aircraft 10. The second aircraft width 28 is sufficiently less than the first aircraft width 18 such that the first quantity 20 of standard aircraft seats 22 can no longer be fit into the uniform aircraft seating columns 34 placed throughout the aircraft interior 12. Within this second region 26 are positioned a second plurality of seating rows 30 which are comprised of a second quantity 32 of standard aircraft seats 22 generally aligned with the first quantity 20 of standard aircraft seats 22. The second quantity 32 being less than the first quantity 20. This generates a region of underutilized space 29 wherein there is insufficient room for placement of a standard aircraft seat 22. It should be understood, that although a specific region of underutilized space 29 has been described, the present invention may be applicable to other such spaces throughout the aircraft interior 12.

Figure 4:
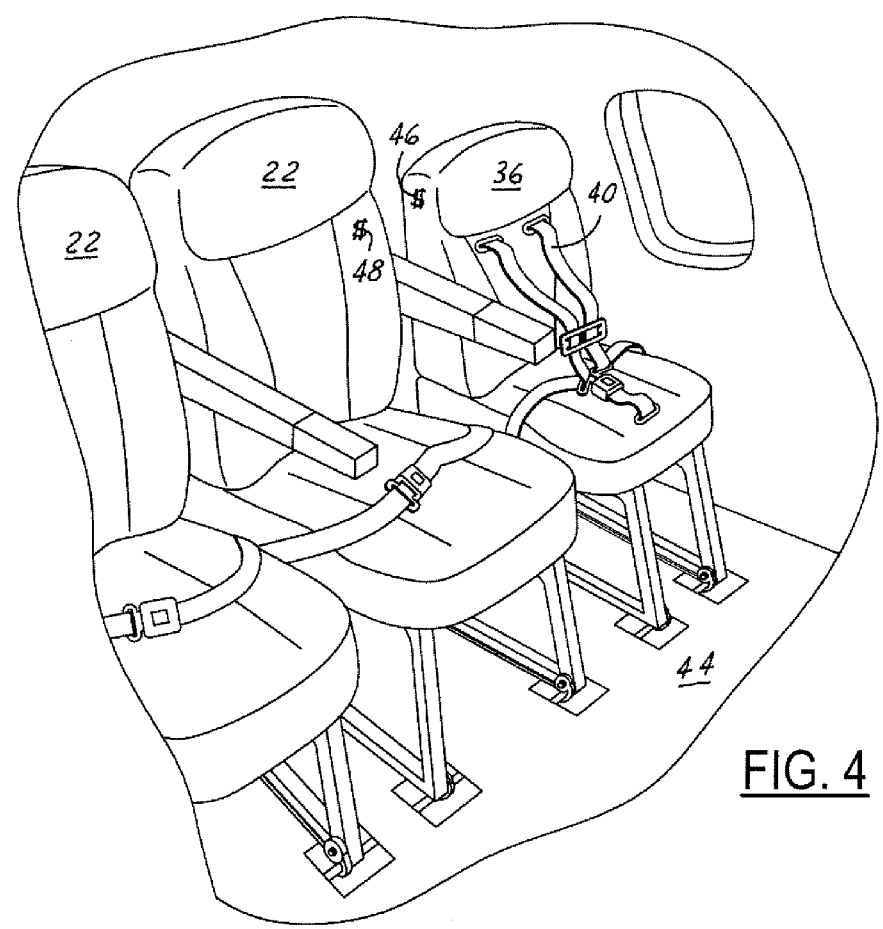
FIG. 4 is a detailed illustration of the aircraft assembly illustrated in FIG. 1, the detail illustrating an embodiment of the aircraft youth seat.
Figure 5:
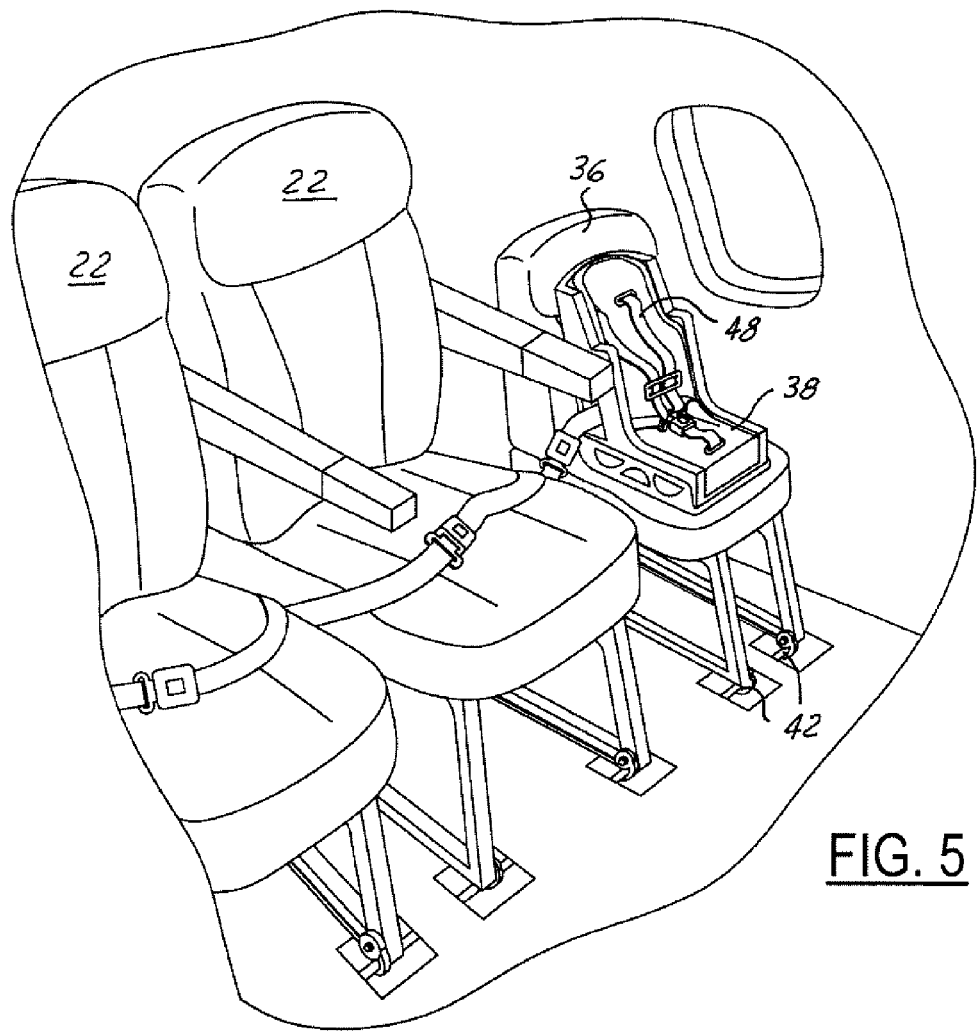
FIG. 5 is a detailed illustration of the aircraft assembly illustrated in FIG. 1, the detail illustrating an alternate embodiment of the aircraft youth seat.

The present invention addresses this inefficiency through the use of at least one reduced dimension youth aircraft seat 36. The at least one reduced dimension youth aircraft seat 36 is defined as a seat with a reduced aircraft seat width 37 smaller than the standard aircraft seat width 28. The reduced aircraft seat width 37 is contemplated to be substantially reduced from the standard aircraft seat width 28 such that the at least one reduced dimension youth aircraft seat 36 is optimized for young passengers such as youth over the age of three years old and weighing less than 100 pounds. Although a youth size constraint has been listed, it should be understood that this range can be determined as a function of the available reduced aircraft seat width 37. In addition, it is contemplated that the reduced dimension youth aircraft seat 36 may be fitted with a four-point restraint 40 to further improve youth comfort and safety (see FIG. 4). In still another embodiment, it is contemplated that the reduced dimension youth aircraft seat 36 may be fitted with a child seat 38 to accommodate youth under the age of three years old.

Although the reduced dimension youth aircraft seat 36 may be permanently installed into the underutilized space 29, the present invention contemplates further reaching applications and flexibility. The present invention contemplates the use of floor latch mounts 42 installed into the floor 44 of the aircraft interior 12. In this fashion the reduced dimension youth aircraft seat 36 may be removed to reduced aircraft weight when not in use and installed when additional seating is required. The placement of the reduced dimension youth aircraft seat 36 adjacent with a standard aircraft seat 22 generates unique marketing and business operation opportunities by creating a unique parent/child seating arrangement.

A wide variety of such unique marketing and business operational techniques are contemplated by the present invention. In one embodiment, the reduced dimension youth aircraft seat 36 can be installed into the aircraft interior 12 during operation phases of airline operation. In such a scenario, the reduced dimension youth aircraft seat 36 can be installed on specific family orientated flights or timetables in order to further improve airline efficiency. This eliminates the need to pre-order airplanes with the reduced dimension youth aircraft seat 36. The use of the floor latch mounts 42 increases this flexibility. The present invention further allows the marketing of the reduced dimension youth aircraft seat 36 at a youth fare 46 which is less than a standard aircraft fare 48 such that parents need not purchase a standard aircraft fare 48 for their children. This can be utilized to promote flights to families. Furthermore, the marketing of the reduced dimension youth aircraft seat 36 ticket in combination with the adjoining standard aircraft seat 22 can be used for further promotion. Additionally, the grouping of the reduced dimension youth aircraft seats 36 within the tapered region 26 allows for the marketing of a family section of the aircraft interior 22. This provides an incentive to families as well as other passengers. Parents may be more willing to bring young children on such flights realizing that their potentially disruptive child will be spatially isolated from the majority of other passengers. Additionally, other passengers may appreciate this arrangement knowing that by choosing seating away from the family section, they will reduce the noise level associated with younger passengers.

The reduced dimension youth aircraft seat 36 may also be utilized to improve aircraft operation to handle more traditional booking problems. Passengers during heavily booked flights may experience being bounced from a flight when more ticketed passengers arrive than are available flights. When children are utilizing full fare standard seats 22 this generates an additional inefficiency. By arranging seating such that the youth are seated in the available reduced dimension youth aircraft seats 36, additional standard aircraft seats 22 may be freed up to handle the overbooked passengers. In addition, by housing reduced dimension youth aircraft seats 36 within the airport, they may be installed upon the realization of an overbooking scenario to effectively increase the seating capacity of the aircraft 10 to reduce the overbooking. This can lead to an increase in consumer satisfaction in addition to reducing airline costs for reimbursement to overbooked passengers. In addition, overhead storage in such large flights may generate problems. By allowing parents to check child seats into luggage knowing that an airline approved reduced dimension youth aircraft seat 36 is available for their child may further reduce passenger stress. It should be understood that although several marketing and benefit strategies utilizing the present invention have been disclosed, a wide variety of alternate strategies would be obvious to one skilled in the art in light of the present disclosure.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of improving aircraft seating efficiency comprising:

positioning a first plurality of seating rows within a first region of an aircraft interior, said first region comprising a first aircraft width, each of said first plurality of seating rows comprising a uniform first quantity of standard aircraft seats, said standard aircraft seats comprising a standard aircraft seat width;

locating a tapered region of said aircraft interior comprising a second aircraft width, said second aircraft width sufficiently less than said first aircraft width such that said first quantity of standard aircraft seats cannot fit within said tapered region;

positioning a second plurality of seating rows within said tapered region, each of said second plurality of seating rows comprising a second quantity of standard aircraft seats having said standard aircraft seat width, said second quantity of standard aircraft seats aligned with said first quantity of standard aircraft seats to form a plurality of aircraft seating columns, said second quantity of standard aircraft seats positioned within said second aircraft width resulting in a region of underutilized space insufficient for placement of one of said standard aircraft seats having said standard aircraft seat width; and positioning at least one reduced dimension youth aircraft seat having a reduced aircraft seat width within said region of underutilized space to increase a net aircraft passenger capacity.

2. A method of improving aircraft seating efficiency as described in claim 1, wherein said at least one reduced dimension youth aircraft seat comprises a child seat.

3. A method of improving aircraft seating efficiency as described in claim 1, wherein said at least one reduced dimension child aircraft seat includes a four-point restraint.

4. A method of improving aircraft seating efficiency as described in claim 1, further comprising:
installing said at least one reduced dimension youth aircraft seat during commercial flight operations, said at least one reduced dimension youth aircraft seat removably installable in said aircraft interior.

5. A method of improving aircraft seating efficiency as described in claim 1, further comprising:
removably mounting said at least one reduced dimension youth aircraft seat to floor latch mounts installed on a floor of said tapered region.

6. A method of improving aircraft seating efficiency comprising:
positioning a first plurality of seating rows within a first region of an aircraft interior, said first region comprising a first aircraft width, each of said first plurality of seating rows comprising a first quantity of standard aircraft seats, said standard aircraft seats comprising a standard aircraft seat width;
positioning a second region of said aircraft interior comprising a second aircraft width;
positioning a second plurality of seating rows within said second region, each of said second plurality of seating rows comprising a second quantity of standard aircraft seats having said standard aircraft seat width, said second quantity of standard aircraft seats positioned within said second aircraft width resulting in a region of underutilized space insufficient for placement of one of said standard aircraft seats having said standard aircraft seat width; and
positioning at least one reduced dimension youth aircraft seat having a reduced aircraft seat width within said region of underutilized space.

7. A method of improving aircraft seating efficiency as described in claim 6, further comprising:
wherein said at least one reduced dimension youth aircraft seat comprises a child seat.

8. A method of improving aircraft seating efficiency as described in claim 6, further comprising:
wherein said at least one reduced dimension child aircraft seat includes a four-point restraint.

9. A method of improving aircraft seating efficiency as described in claim 6, further comprising:
installing said at least one reduced dimension youth aircraft seat during commercial flight operations.

10. A method of improving aircraft seating efficiency as described in claim 6, further comprising:
removably mounting said at least one reduced dimension youth aircraft seat to floor latch mounts installed on a floor of said second region.

11. An aircraft comprising:
a first plurality of seating rows within a first region of an aircraft interior, said first region comprising a first aircraft width, each of said first plurality of seating rows comprising a uniform first quantity of standard aircraft seats, said standard aircraft seats comprising a standard aircraft seat width;
a tapered region of said aircraft interior comprising a second aircraft width, said second aircraft width sufficiently less than said first aircraft width such that said first quantity of standard aircraft seats cannot fit within said tapered region;
a second plurality of seating rows within said tapered region, each of said second plurality of seating rows comprising a second quantity of standard aircraft seats having said standard aircraft seat width, said second quantity of standard aircraft seats aligned with said first quantity of standard aircraft seats to form a plurality of aircraft seating columns, said second quantity of standard aircraft seats positioned within said second aircraft width resulting in a region of underutilized space insufficient for placement of one of said standard aircraft seats having said standard aircraft seat width; and
at least one reduced dimension youth aircraft seat having a reduced aircraft seat width positioned within said region of underutilized space to increase a net aircraft passenger capacity.

12. An aircraft as described in claim 11, wherein said at least one reduced dimension youth aircraft seat comprises a child seat.

13. An aircraft as described in claim 11, wherein said at least one reduced dimension youth aircraft seat includes four-point restraints.

14. An aircraft as described in claim 11, wherein said at least one reduced dimension youth aircraft seat is removably attached to said aircraft interior.

15. An aircraft as described in claim 14, wherein said at least one reduced dimension youth aircraft seat is attaches to said aircraft interior by engaging floor latch mounts permanently affixed to said aircraft interior.

16. An aircraft comprising:
a first plurality of seating rows within a first region of an aircraft interior, said first region comprising a first aircraft width, each of said first plurality of seating rows comprising a first quantity of standard aircraft seats, said standard aircraft seats comprising a standard aircraft seat width;
a second region of said aircraft interior comprising a second aircraft width;
a second plurality of seating rows within said second region, each of said second plurality of seating rows comprising a second quantity of standard aircraft seats having said standard aircraft seat width, said second quantity of standard aircraft seats positioned within said second aircraft width resulting in a region of underutilized space insufficient for placement of one of said standard aircraft seats having said standard aircraft seat width; and
at least one reduced dimension youth aircraft seat having a reduced aircraft seat width positioned within said region of underutilized space within one of said second plurality of seating rows.

17. An aircraft as described in claim 16, wherein said at least one reduced dimension youth aircraft seat includes four-point restraints.

18. An aircraft as described in claim 13, wherein said at least one reduced dimension youth aircraft seat attaches to said aircraft interior by engaging floor latch mounts permanently affixed to said aircraft interior.

* * * * *